Patented Mar. 6, 1951

2,543,748

UNITED STATES PATENT OFFICE 2,543,748

TURKEY ENTEROHEPATITIS CONTROL COMPOSITION

Emanuel Waletzky, Stamford, Conn., assignor to American Cyanamid Company, New York, N. Y., a corporation of Maine No Drawing. Application July 2, 1949, Serial No. 102,925

5 Claims. (Cl. 167—53.1)

This invention deals with veterinary remedial measures and more particularly, with new compositions and a method for the control of morbidity and mortality in turkeys due to enterohepatitis (blackhead).

Blackhead is recognized as one of the most destructive diseases in turkey husbandry. It is found in every area where turkeys are raised. This disease was one of the prime causes for the shifting of the turkey industry from the East to other less heavily infected sections of the United States.

The disease is considered to be caused by a protozoan organism called *Histomonas meleagridis*. These organisms are discharged in the droppings of the birds and seldom survive more than 24 hours in an unprotected condition. However, they have been found to be harbored in the egg of the common cecal worm *Heterakis gallinae*, and are capable of establishing an infection when the cecal worm egg is ingested by the turkey.

The most common symptoms of blackhead are drooping wings, drowsiness, lowered head, ruffled feathers and yellow-colored diarrhea. However, young birds may die without manifesting any of these symptoms. The mortality in a flock of young birds infected with blackhead may reach as high as 80% to 90%.

In general, with the possible exception of parenteral arsenical administration, which is, of course, uneconomic, the only method of controlling blackhead has been the controlling of the spread of infection. The healthy birds are isolated from the flock and the disease is allowed to run its course on the infected birds. The diseased birds, by and large, represent a complete loss to the farmer, inasmuch as the mortality rate runs in excess of 90%.

I have found that compounds of the general formula

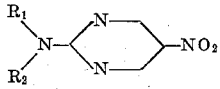

wherein $R_1$ may be chosen from the group consisting of hydrogen and alkyl radicals, and $R_2$ is an alkyl radical, will mitigate the course of the disease and will lead to almost 100% recovery of infected turkeys when administered to the birds within one week of infection.

These compounds have been found to be effective when administered by admixture, suspension or dispersion in the normal elements of sustenance ingested by the turkey. By normal elements of sustenance I include the feed and drink normally partaken by the birds such as grain, mash, scratch, water and/or other liquids.

The general range of concentration of the therapeutic agents in the total sustenance is from 0.01% or less to 1.5%. The optimal concentrations for effective therapy are in the range from 0.02% to 0.2% of the total feed or drinking water. With these optimal concentrations the daily drug intake for infected birds varies from 10 mg. of drug per kg. of body weight, to about 400 mg./kg. These amounts of drug may be administered to advantage in some cases by daily dosing with individual tablets or by drenching or otherwise.

In general, the precise dosage depends on the particular compound and the severity of the infection. The compounds, when administered at the requisite concentrations, show little or no toxic effects, and the nutrition, rate of growth and general well-being is not disturbed.

Test animals which were infected with *Histomonas meleagridis* by administering suspensions of infected cecal worm in amounts which killed more than 90% of the controls, recovered and flourished when these compounds were administered in the requisite amounts at any time after the infection had been established, up to as much as one week after the time of the infection. When the treatment has been delayed, administration should be in the range of the higher concentrations and should continue at these higher concentrations for at least two days. However, in the field these compounds may effectively be administered as prophylactic long term continuous treatments at the lower concentrations.

Compounds which when mixed with turkey sustenance are the subject of this invention include: 2-dimethylamino-5-nitropyrimidine; 2-methylamino-5-nitropyrimidine; 2-ethylamino-5-nitropyrimidine; 2-diethylamino-5-nitropyrimidine; 2-n-propylamino-5-nitropyrimidine; 2-di-n-propylamino-5-nitropyrimidine; 2-isopropylamino-5-nitropyrimidine; 2-di-isopropylamino-5-nitropyrimidine; 2-n-butylamino-5-nitropyrimidine; 2-di-n-butylamino-5-nitropyrimidine; 2-(di-2-hydroxyethylamino)-5-nitropyrimidine; 2-(2-hydroxyethylamino)-5-nitropyrimidine; and related compounds.

In contrast to the above, many compounds not having the structure represented by the general formula have been found to be completely ineffective and in most instances severely toxic even though closely related structurally.

Although the birds may be given direct individual doses of these compounds by oral administration one or more times a day, the preferred method of treatment and the one which has yielded consistently good results is to allow them to feed ad libitum on the normal diet in which the effective compounds have been mixed or dispersed. Such vehicles of medication should contain enough of the drug so that the dosage ranges indicated above will be ingested in the course of fulfilling the daily food requirements of the bird.

The preferred manner of supplying the compounds of the present invention for administration is to thoroughly disperse the therapeutic material in the birds' feed or drinking water in the concentration ranges indicates below. The higher concentration ranges are for those instances where the compounds are to be mixed with selected portions of the birds' daily rations, i. e., the mash or the water, the concentration being so regulated that the bird will daily ingest 10–400 mgs. of the drug per kg. of body weight.

Under conditions where the probability of infection is extremely high and it is desired to administer the compounds over a long period of time, it has been found effective to administer medicated mash containing 0.01% to 1.0% of these compounds to protect the birds from the deleterious consequences of the infection. Of course, if the infection has already been established, it is preferable to administer the compounds in higher concentrations ranging up to 1.5% by weight of the daily total sustenance intake.

These compounds may also be supplied to the turkeys by dissolving or dispersing them in the drinking water or other liquid constituents of the diet such as skim milk, buttermilk, or the like.

The drugs are dissolved, suspended or dispersed in liquids in concentrations up to 0.5% by weight. Where the drug is less soluble in the liquid, suspending and/or dispersing agents are used to assure the requisite concentration.

Since the compounds are believed to be novel the appended examples indicate a preferred synthesis of representative compounds from known starting materials. The other compounds coming within the scope of the disclosure can be prepared by analogous methods with analogous starting materials. Unless otherwise indicated all parts are by weight.

EXAMPLE 1

*2-dimethylamino-5-nitropyrimidine*

To a suspension of 21 parts of 2-chloro-5-nitropyrimidine (Roblin, Winnek and English, J. Am. Chem. Soc. 64, 569 (1942)) in 65 parts of 50% ethanol was added, with stirring, 33 parts of 40% dimethylamine. A spontaneous exothermic reaction was obtained but the mixture was heated with stirring for 30 minutes to insure completion of the reaction. The mixture was cooled and the solid material was filtered and recrystallized from methyl ethyl ketone. The product 2-dimethylamino-5-nitropyrimidine was obtained, 71% yield and had a melting point 222–222.5° C.

The above mentioned compound was incorporated in a mash which was fed ad libitum to turkeys infected with massive doses of *Histomonas meleagridis*. This mash mixture proved effective in preventing mortality due to "turkey blackhead" as compared to control turkeys which were similarly infected and fed the usual mash without any added therapeutic agent.

EXAMPLE 2

*2-methylamino-5-nitropyrimidine*

By substituting methylamine for the dimethylamine in the process of Example 1, there was obtained 2-methylamino-5-nitropyrimidine, with a melting point 227–229° C.

The above mentioned compound was incorporated in a mash which was fed ad libitum to turkeys infected with massive doses of *Histomonas meleagridis*. This mash mixture proved effective in preventing mortality due to "turkey blackhead" as compared to control turkeys which were similarly infected and fed the usual mash without any added therapeutic agent.

EXAMPLE 3

*2-ethylamino-5-nitropyrimidine*

By substituting ethylamine for the dimethylamine in the process of Example 1, there was obtained 2-ethylamino-5-nitropyrimidine with a melting point 175–175.5° C.

The above mentioned compound was incorporated in a mash which was fed ad libitum to turkeys infected with massive doses of *Histomonas meleagridis*. This mash mixture proved effective in preventing mortality due to "turkey blackhead" as compared to control turkeys which were similarly infected and fed the usual mash without any added therapeutic agent.

EXAMPLE 4

*2-diethylamino-5-nitropyrimidine*

By substituting diethylamine for the dimethylamine in the process of Example 1, there was obtained 2-diethylamino-5-nitropyrimidine with a melting point 104.5–105.5° C.

The above mentioned compound was incorporated in a mash which was fed ad libitum to turkeys infected with massive doses of *Histomonas meleagridis*. This mash mixture proved effective in preventing mortality due to "turkey blackhead" as compared to control turkeys which were similarly infected and fed the usual mash without any added therapeutic agent.

EXAMPLE 5

*2-n-propylamino-5-nitropyrimidine*

By substituting n-propylamine for the dimethylamine in the process of Example 1, there was obtained 2-n-propylamino-5-nitropyrimidine with melting point 119–119.5° C.

The above mentioned compound was incorporated in a mash which was fed ad libitum to turkeys infected with massive doses of *Histomonas meleagridis*. This mash mixture proved effective in preventing mortality due to "turkey blackhead" as compared to control turkeys which were similarly infected and fed the usual mash without any added therapeutic agent.

EXAMPLE 6

*2-di-n-propylamino-5-nitropyrimidine*

By substituting di-n-propylamine for the dimethylamine in the process of Example 1, there was obtained 2-di-n-propylamino-5-nitropyrimidine with melting point 45.5–46° C.

The above mentioned compound was incorporated in a mash which was fed ad libitum to turkeys infected with massive doses of *Histomonas meleagridis*. This mash mixture proved effective in preventing mortality due to "turkey blackhead" as compared to control turkeys which were similarly infected and fed the usual mash without any added therapeutic agent.

EXAMPLE 7

2-n-butylamino-5-nitropyrimidine

By substituting n-butylamine for the dimethylamine in the process of Example 1, there was obtained 2-n-butylamino-5-nitropyrimidine with a melting point 122° C.

The above mentioned compound was incorporated in a mash which was fed ad libitum to turkeys infected with massive doses of *Histomonas meleagridis*. This mash mixture proved effective in preventing mortality due to "turkey blackhead" as compared to control turkeys which were similarly infected and fed the usual mash without any added therapeutic agent.

EXAMPLE 8

2-di-n-butylamino-5-nitropyrimidine

By substituting di-n-butylamine for the dimethylamine in the process of Example 1, there was obtained 2-di-n-butylamino-5-nitropyrimidine, with a melting point 49–50° C.

The above mentioned compound was incorporated in a mash which was fed ad libitum to turkeys infected with massive doses of *Histomonas meleagridis*. This mash mixture proved effective in preventing mortality due to "turkey blackhead" as compared to control turkeys which were similarly infected and fed the usual mash without any added therapeutic agent.

I claim:

1. A medicated poultry and animal feed containing elements of turkey sustenance and compounds of the general formula

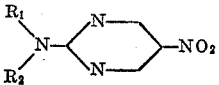

wherein $R_1$ is chosen from the group consisting of hydrogen and lower alkyl radicals and $R_2$ is a lower alkyl radical.

2. A medicated poultry and animal feed containing elements of turkey sustenance and compounds of the general formula

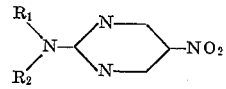

wherein $R_1$ is chosen from the group consisting of hydrogen and lower alkyl radicals and $R_2$ is a lower alkyl radical, in the concentration range of at least 0.01% by weight.

3. An agent for the control of blackhead in turkeys which comprises a turkey feed containing 2-dimethylamino-5-nitropyrimidine.

4. An agent for the control of blackhead in turkeys which comprises a turkey feed containing 2-diethylamino-5-nitropyrimidine.

5. An agent for the control of blackhead in turkeys which comprises a turkey feed containing 2-methylamino-5-nitropyrimidine.

EMANUEL WALETZKY.

REFERENCES CITED

The following references are of record in the file of this patent:

Hale: Journal of the American Chemical Society, vol. 34, page 92.

Diseases and Parasites of Poultry, U. S. D. A. Farmers' Bulletin, No. 1652 (1932), page 35.